(No Model.)
M. L. WILCOX.
BICYCLE.
No. 523,562. Patented July 24, 1894.
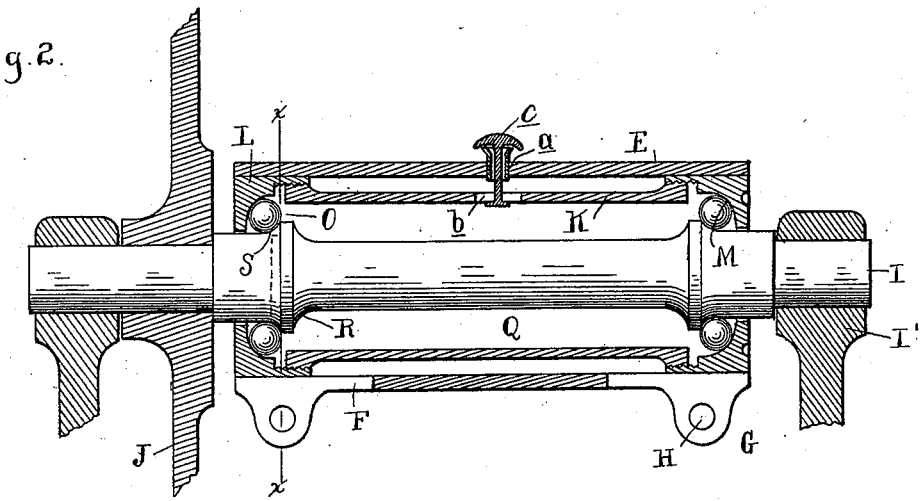
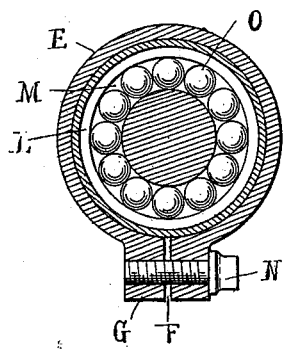
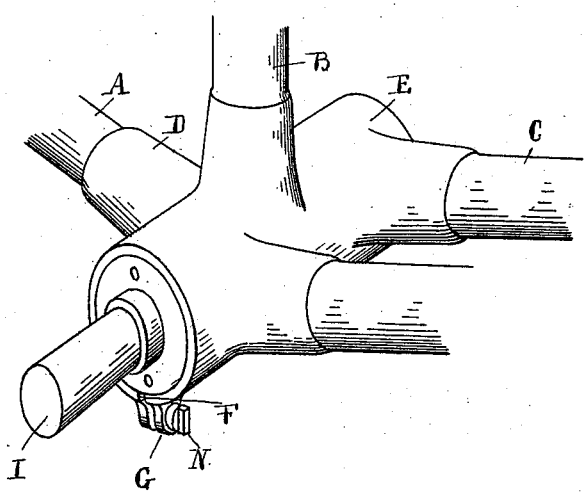
Witnesses
A. L. Hobby
M. B. O'Dogherty
Inventor
Melvin L. Wilcox
By Wm. S. Sprague
Attys.

UNITED STATES PATENT OFFICE.

MELVIN L. WILCOX, OF BAY CITY, MICHIGAN, ASSIGNOR TO THE NATIONAL CYCLE MANUFACTURING COMPANY, OF SAME PLACE.

BICYCLE.

SPECIFICATION forming part of Letters Patent No. 523,562, dated July 24, 1894.

Application filed March 6, 1894. Serial No. 602,520. (No model.)

*To all whom it may concern:*

Be it known that I, MELVIN L. WILCOX, a citizen of the United States, residing at Bay City, in the county of Bay and State of Michigan, have invented certain new and useful Improvements in Bicycles, of which the following is a specification, reference being had therein to the accompanying drawings.

This invention relates to a new and useful improvement in bicycles and consists in the construction and arrangement of parts hereinafter described and definitely pointed out in the claims.

In the drawings, Figure 1 is a perspective view of my improved hanger and bearing, the sprocket wheels and cranks being removed. Fig. 2 is a vertical, central, longitudinal section therethrough. Fig. 3 is a cross section on line $xx$ in Fig. 2.

A. B. and C. show the meeting ends of the members of the frame, which are adapted to engage in suitable nipples D, formed centrally on the tubular bracket or hanger E. This hanger at its ends and preferably, on its under side, is provided with longitudinal slots F, which extend a sufficient distance to allow the ends of the bracket to be contracted to form a clamp for holding the crank shaft bearing in position. To this end, I form on either side of the slots at the ends, the depending ears or lugs G, provided with screw threaded apertures H, to receive the clamping bolts N.

I is the crank shaft. I' the crank secured to the ends thereof.

J is the sprocket wheel secured to the crank shaft and over which the sprocket chain passes.

K is a sleeve of a diameter to fit loosely within the hanger and provided exteriorly at the ends, with suitable screw threads to receive the cup shaped caps L. The end, or bottom walls of these cups are apertured to embrace the crank shaft and make there a dust-proof joint. On the inner face of these end walls are formed the ball races M. The crank shaft is provided with suitable cone bearings S, and O are the balls adapted to run between the cone bearing and the ball races in the caps as plainly shown in the drawings.

$a\ b$ are aligned oil holes in the hanger and sleeve respectively, capped by the flanged pin $c$.

The parts being thus constructed and combined as shown in the drawings, the crank shaft bearing (comprising the inner sleeve and caps with the shaft in position therein with interposed balls) is slipped into the hanger, the inner diameter thereof being substantially the outer diameter of the caps, the caps may be adjusted to give the proper bearing on the balls, and then by tightening the clamping bolt N. the crank shaft bearing will be held firmly within the brackets. Now to adjust either cap, it is evident that all that is required is to loosen the clamping bolt N at one end of the hanger, and turn the cap at that end to or from the cone bearing.

If it is desired to remove the crank shaft this can be done by removing the crank at end opposite sprocket wheel, and loosening the two clamping bolts N, when the entire crank bearing may be withdrawn from the hanger. After the crank shaft has been removed from the crank hanger, the balls at the sprocket end can be taken out without removing either the other crank, or sprocket wheel, by unscrewing the sleeve from the ball cap, after which by pressing the ball cup against the sprocket wheel, there is space enough left between the cone on the shaft and the threaded end of the cup, to admit of the ball being readily removed. The oil being fed through the apertures $a\ b$ into the inner sleeve will flow to the ends thereof and accumulate in the bottom of the ball races in the caps, and into this the balls will dip at each revolution.

It is evident that dust can only reach the balls or their bearings through such space as there may be around the shaft at the ends of the caps, and in practice this is found to be practically dust-proof.

In case of broken balls in the bearings, the cones R, R, are of such diameter that will admit of said balls being forced into the chamber Q, by the rotation of the remaining whole ones, thus obviating the destruction of the balls, cups, and cones.

It will be seen that the ball races are formed at the free extremity of the crank shaft bearing so as to separate the two ball bearings as much as possible, thereby obtaining the greatest distance between bearings, with the shortest possible crank shaft, thus giving a very narrow "tread," that is distance from center to center of pedals.

By the construction which embodies the caps secured to the sleeve, and clamped in the crank hanger, or bracket, the whole crank shaft bearing may be longitudinally adjusted, and with it the shaft, thus aligning the sprocket wheels.

What I claim as my invention is—

1. In a bicycle, the combination of a sleeve having its ends screw-threaded, cup shaped caps engaging thereon, having ball races formed on end wall, the crank shaft, having cone bearings, and a tubular bracket, having split ends adapted to be clamped upon the caps, substantially as described.

2. In a bicycle, the combination of the crank shaft bearing, comprising the crank shaft having cones rigid thereon, the sleeve surrounding the shaft, caps adjustably secured on the ends of the sleeve and having complementary ball bearings, the balls in said bearings, the hanger, having clamping devices for said crank shaft bearing, permitting longitudinal adjustment thereof, whereby the sprocket wheels may be aligned, substantially as described.

In testimony whereof I affix my signature in presence of two witnesses.

MELVIN L. WILCOX.

Witnesses:
JAMES WHITTEMORE,
MERRILL F. WILCOX.